United States Patent
Lindtner

(10) Patent No.: US 11,255,419 B2
(45) Date of Patent: Feb. 22, 2022

(54) AXLE DRIVE

(71) Applicant: MAGNA Powertrain GmbH & Co KG, Lannach (AT)

(72) Inventor: Werner Lindtner, Graz (AT)

(73) Assignee: MAGNA POWERTRAIN GMBH & CO KG, Lannach (AT)

(*) Notice: Subject to any disclaimer, the term of this patent is extended or adjusted under 35 U.S.C. 154(b) by 0 days.

(21) Appl. No.: 16/633,846

(22) PCT Filed: Jun. 19, 2018

(86) PCT No.: PCT/EP2018/066289
§ 371 (c)(1),
(2) Date: Jan. 24, 2020

(87) PCT Pub. No.: WO2019/020280
PCT Pub. Date: Jan. 31, 2019

(65) Prior Publication Data
US 2020/0232547 A1   Jul. 23, 2020

(30) Foreign Application Priority Data
Jul. 25, 2017   (DE) .................... 10 2017 212 781.3

(51) Int. Cl.
*F16H 48/10*   (2012.01)
*F16H 48/22*   (2006.01)

(52) U.S. Cl.
CPC ............. *F16H 48/10* (2013.01); *F16H 48/22* (2013.01); *F16H 2048/104* (2013.01)

(58) Field of Classification Search
CPC ..... F16H 48/10; F16H 48/22; F16H 2048/104
See application file for complete search history.

(56) References Cited

U.S. PATENT DOCUMENTS 5,718,300 A    2/1998  Frost
2004/0242369 A1* 12/2004  Alfredsson ............... F16H 3/54
                                                              475/320

FOREIGN PATENT DOCUMENTS

| DE | 102009015442 A1 | 9/2010 | |
| DE | 102011005615 A1 | 9/2012 | |
| DE | 102011102749 A1 | 11/2012 | |
| DE | 102014201245 A1 | 7/2015 | |
| WO | 2005120877 A1 | 12/2005 | |
| WO | WO-2005120877 A1 * | 12/2005 | ............. B60K 17/16 |
| WO | 2016092751 A1 | 6/2016 | |

OTHER PUBLICATIONS

International Search Report and Written Opinion dated Oct. 12, 2018 from International Patent Application No. PCT/EP2018/066289 (with English Translation of International Search Report).

* cited by examiner

*Primary Examiner* — Huan Le
(74) *Attorney, Agent, or Firm* — Dickinson Wright PLLC

(57) ABSTRACT

An axle drive, comprising a drive shaft, a first output shaft and a second output shaft, a first planetary gear mechanism and a second planetary gear mechanism, it being possible for a drive torque of the drive shaft to be transmitted by means of the first planetary gear mechanism and the second planetary gear mechanism to the first and second output shaft, wherein the second planetary gear mechanism is configured radially on the outside coaxially around the first planetary gear mechanism, the internal gear of the first planetary gear mechanism forming the sun gear of the second planetary gear mechanism.

18 Claims, 1 Drawing Sheet

AXLE DRIVE

CROSS-REFERENCE TO RELATED APPLICATIONS

This application is a National Stage of International Application No. PCT/EP2016/066289, filed Jun. 19, 2018 which claims priority to German Patent Application No. DE102017212781.3, filed Jul. 25, 2017. The entire disclosures of each of the above application are incorporated herein by reference.

FIELD OF THE INVENTION

The present invention relates to an axle drive, comprising a drive shaft, a first output shaft and a second output shaft.

BACKGROUND OF THE INVENTION

This section provides information related to the present disclosure which is not necessarily prior art Such axle drives are used in motor vehicles for transmitting a drive torque from a drive motor, for example an electric motor, to two output shafts, in particular to a left and a right axle of the motor vehicle and ultimately to driven wheels.

An increase or reduction of the input speed to a desired rotational speed of the outputs can thereby be carried out.

It is also known that axle drives can have a differential in order to permit a rotational speed difference between the first and second output shaft.

It is known that such axle drives can use a planetary gear mechanism for distributing the drive torque to the output shafts. There are also already solutions which use a plurality of planetary gear mechanisms and thus usually require a larger axial installation space. Such gear mechanisms are known, for example, from DE 10 2014 201 245 A1 or DE 10 2011 102 749 A1.

DE 10 2011 005 615 A1 discloses a drive device for driving a driven vehicle axle, comprising a drive motor, an electric machine and a gear mechanism, wherein the gear mechanism has two minus planetary gear sets of identical construction which are arranged coaxially with respect to one another, wherein the sun gears of the first planetary gear set and of the second planetary gear set are connected together in a rotationally fixed manner by means of a shaft, wherein the internal gear of the first planetary gear set and the internal gear of the second planetary gear set have, in addition to a continuous internal toothing system for achieving the internal gear function, an external toothing system in the form of a crown or conical gear toothing system, with which there meshes a conical or crown gear of a vertical shaft connected in a rotationally fixed manner to the output of the electric machine, wherein an output of the drive motor is connected by means of a transmission stage to the shaft which connects the sun gear of the first planetary gear set to the sun gear of the second planetary gear set and wherein the output of the drive device takes place via the web of the first planetary gear set and the web of the second planetary gear set, which are each connected to a wheel of the driven vehicle axle.

SUMMARY OF THE INVENTION

This section provides a general summary of the disclosure, and is not a comprehensive disclosure of its full scope or all of its features It is an object of the invention to provide an axle drive which permits speed transmission and a differential function and thereby requires a small axial installation space.

The object of the invention is achieved by an axle drive, comprising a drive shaft, a first output shaft and a second output shaft, a first planetary gear mechanism and a second planetary gear mechanism, it being possible for a drive torque of the drive shaft to be transmitted by means of the first planetary gear mechanism and the second planetary gear mechanism to the first and second output shaft, wherein the second planetary gear mechanism is configured radially on the outside coaxially around the first planetary gear mechanism, the internal gear of the first planetary gear mechanism forming the sun gear of the second planetary gear mechanism.

According to the invention there are used two planetary gear mechanisms which are arranged coaxially with respect to one another in at least approximately the same axial position, so that the axial length of the axle drive can be small.

For this purpose, the internal gear of the first planetary gear mechanism is used twice. It is equipped, in addition to its internal toothing system, also with an external toothing system and, by means of this external toothing system, at the same time forms the sun gear of the surrounding second planetary gear mechanism.

By using two planetary gear mechanisms, the two output shafts can be connected to the drive shaft in such a manner that they are normally subjected to the same torque. Depending on the load on the wheels or output shafts, it is possible to set a different rotational speed at the output shafts and a differential effect is thus produced.

Preferably, the internal gear of the first planetary gear mechanism has a toothing system, in particular a helical toothing system, on its outer side and/or on its inner side.

Particularly preferably, the internal gear of the first planetary gear mechanism has a helical toothing system on its outer side and on its inner side, with the result that the axial forces on the internal gear of the first planetary gear mechanism are compensated for overall. According to the invention, "compensated for" also includes partially compensated for, that is to say partial mutual cancellation of the forces. Preferably, however, the forces are completely or almost completely compensated for.

The internal gear of the first planetary gear mechanism can preferably be guided axially merely by way of two sliding guides and guided radially by way of the helical toothing systems.

The internal gear of the first planetary gear mechanism preferably forms a ring which has a helical toothing system on its outer side and its inner side. This ring is mounted axially merely by way of lateral sliding guides.

The drive shaft of the axle drive preferably drives the sun gear of the first planetary gear mechanism or configures the sun gear.

Preferably, the output to the first output shaft takes place from the planetary carrier of the first planetary gear mechanism.

Preferably, the output to the second output shaft takes place from the internal gear of the second planetary gear mechanism.

The internal gear of the first planetary gear mechanism preferably rotates counter to the rotational direction of the first and second output shaft.

The planets of the second planetary gear mechanism are preferably mounted fixedly on the housing.

The drive shaft can preferably be configured as a hollow shaft, and the first output shaft can be arranged radially on the inside in the drive shaft.

Preferably, needle bearings are arranged and/or friction elements are arranged between the first and the second output shaft. Such friction elements can in particular be subjected to an axial force from a helical toothing system of the internal gear of the first planetary gear mechanism under tensile load, in order to achieve a locking action of the differential.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
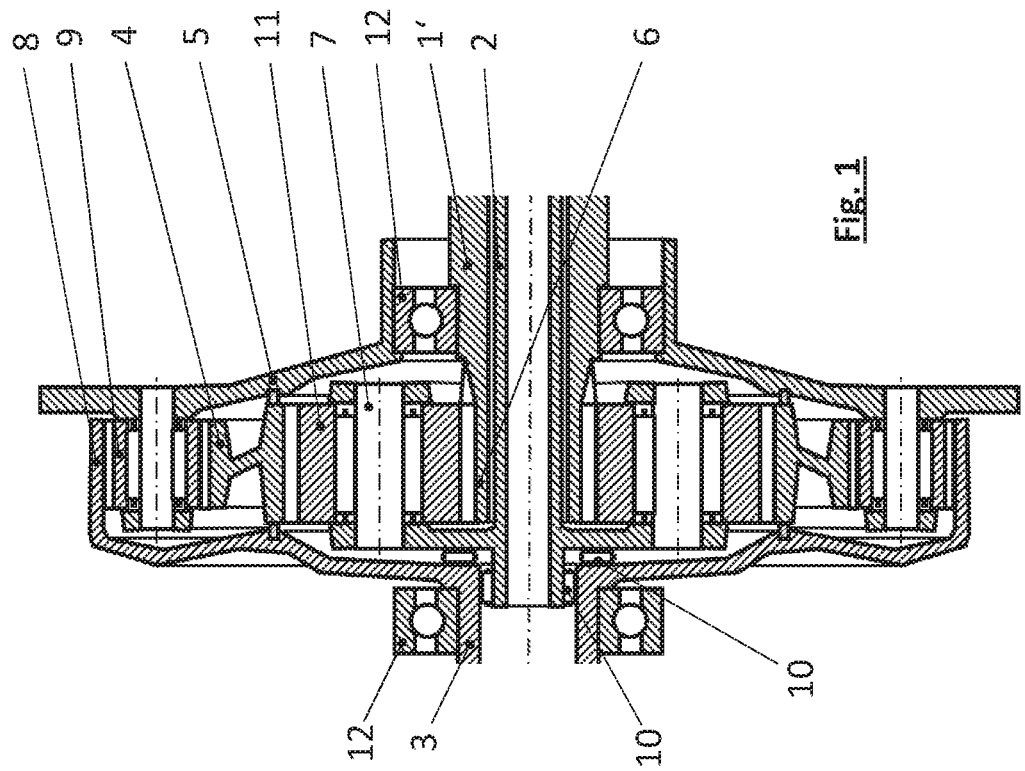
FIG. 1 is a sectional view of an axle drive according to the invention.

FIG. 1 shows an axle drive according to the invention which comprises a drive shaft 1', a first output shaft 2, which leads to the right in FIG. 1, and a second output shaft 3, which leads to the left in FIG. 1. The drive shaft 1' can be driven by an electric motor.

The axle drive comprises a first planetary gear mechanism and a second planetary gear mechanism. The second planetary gear mechanism is configured radially on the outside, coaxially around the first planetary gear mechanism. A drive torque of the drive shaft 1' can be transmitted by means of the first planetary gear mechanism and the second planetary gear mechanism to the first and second output shaft 2, 3.

The first planetary gear mechanism comprises a sun gear 6, wherein the sun gear 6 of the first planetary gear mechanism is driven by the drive shaft 1', or is configured on the drive shaft 1'.

The sun gear 6 meshes with planets 11 which are mounted on a planetary carrier 7.

The transmission of the torque to the first output shaft 2 takes place from the planetary carrier 7 of the first planetary gear mechanism, or the planetary carrier 7 can be integrally formed with the first output shaft 2.

The planets 11 mesh with the internal toothing system, which is in the form of a helical toothing system, of the internal gear 4 of the first planetary gear mechanism.

The internal gear 4 of the first planetary gear mechanism at the same time forms the sun gear of the second planetary gear mechanism. The outer side of the internal gear 4 likewise has a helical toothing system. The internal gear 4 can be configured as a ring which is supported laterally by two sliding bearings 5.

The internal gear 4 and thus the sun gear of the second planetary gear mechanism meshes with planets 9 of the second planetary gear mechanism. The planets 9 of the second planetary gear mechanism are mounted fixedly on the housing. The planetary carrier of the second planetary gear mechanism is thus configured by the housing or in a rotationally fixed manner with the housing of the axle drive.

The planets 9 mesh with an internal toothing system of the internal gear 8 of the second planetary gear mechanism. The torque is transmitted to the second output shaft 3 from the internal gear 8 of the second planetary gear mechanism, or the internal gear 8 can be integrally formed with the second output shaft 3.

In this configuration, the internal gear 4 of the first planetary gear mechanism rotates counter to the rotational direction of the first and second output shaft 2, 3.

The drive shaft 1' is configured as a hollow shaft, and the first output shaft 2 is arranged radially on the inside in the drive shaft 1'.

The drive shaft 1' and the second output shaft 3 are mounted via bearings 12 on the housing of the axle drive.

Needle bearings 10 are arranged between the first and the second output shaft 2, 3. Instead or in addition, friction elements can also be arranged between the first and the second output shaft 2, 3, in order to achieve a higher inherent locking effect of the differential by increasing the friction between the output shafts 2 and 3 by means of the axial force brought about by the helical toothing system. A controllable differential lock can also be arranged between the output shafts 2 and 3.

Figure 2:
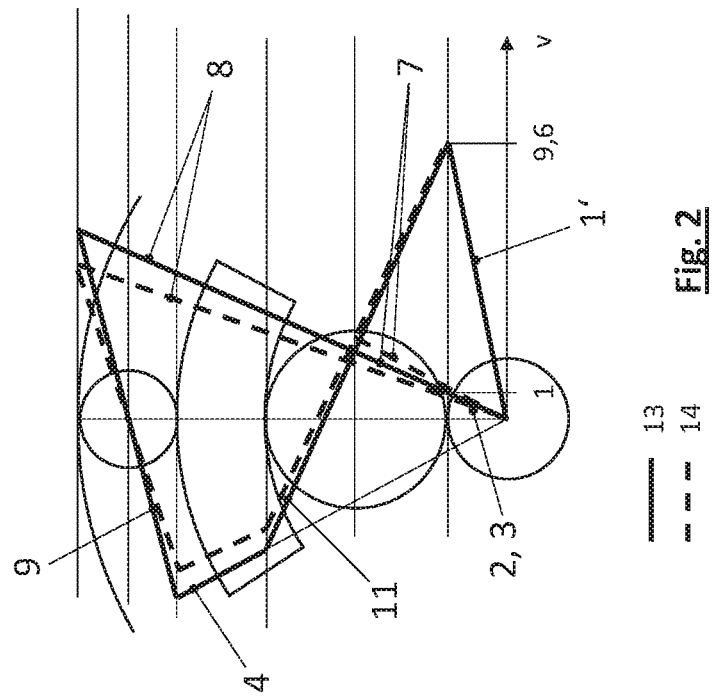
FIG. 2 shows, schematically, the kinematics of an axle drive according to the invention according to FIG. 1.

FIG. 2 shows the circumferential speeds of the individual components of the axle drive of FIG. 1, wherein the circumferential speed v is shown on the x-axis in each case and the height on the y-axis of FIG. 2 corresponds to the radial distance of the component or of the respective circumference according to FIG. 1.

The solid line 13 represents an operation of the axle drive with the same rotational speeds at the first output shaft 2 and the second output shaft 3 and therefore the same speeds—based on the same radius—of the planetary carrier 7 of the first planetary gear mechanism and the internal gear 8 of the second planetary gear mechanism. The represented line of the circumferential speed of the planetary carrier 7 therefore coincides, with equal speeds of the output shafts 2 and 3, with the line of the circumferential speed of the internal gear 8.

The planets 11 and the internal gear 4 of the first planetary gear mechanism rotate in the opposite direction compared to the drive shaft 1' and the output shafts 2 and 3.

The broken line 14 represents the corresponding speeds in the case of an operation in which the first output shaft 2, and therefore the planetary carrier 7, rotates more quickly than the second output shaft 3, and therefore the internal gear 8. In this situation, a different speed of a left and of a right wheel of a motor vehicle is made possible.

The stationary gear ratio (sun to internal gear with the planetary carrier stationary) of the gear mechanism shown is, for example, 3.8. Therefore, 4.8 times the input torque is transmitted to the planetary carrier 7 of the first planetary gear mechanism and thus passed to the right, first output 2. The stationary gear ratio of the outer planetary gear mechanism is −1.263, namely 4.8/−3.8. Thus, 4.8 times the input torque is likewise obtained at the internal gear 8 of the second planetary gear mechanism, or at the left, second output 3. The torque division is thus 50:50, the axle ratio is 9.6. This axle ratio can also be read off from FIG. 2, since the circumferential speed v at the drive shaft 1' is 9.6 when the circumferential speed v of the first and second output shaft 2, 3, with approximately the same circumference, is 1. With such an axle ratio, transmission ratios in the range from approximately 5 to 10 can easily be achieved, and higher transmission ratios can be achieved, for example, by connecting a further planetary gear mechanism upstream.

LIST OF REFERENCE DESIGNATIONS

1' drive shaft
2 first output shaft
3 second output shaft
4 internal gear of the first planetary gear mechanism
5 sliding guide
6 sun gear of the first planetary gear mechanism
7 planetary carrier of the first planetary gear mechanism
8 internal gear of the second planetary gear mechanism
9 planets of the second planetary gear mechanism
10 needle bearing
11 planets of the first planetary gear mechanism
12 bearing
13 same rotational speeds first and second output shaft
14 first output shaft faster than second output shaft
v circumferential speed

What is claimed is:

1. An axle drive, comprising a drive shaft, a first output shaft and a second output shaft, a first planetary gear mechanism and a second planetary gear mechanism, wherein the first planetary gear mechanism and the second planetary gear mechanism are configured to transmit a drive torque of the drive shaft to the first and second output shafts,
    wherein the second planetary gear mechanism is positioned radially on an outside of the first planetary gear mechanism and coaxially around the first planetary gear mechanism, and wherein an internal gear of the first planetary gear mechanism forms a sun gear of the second planetary gear mechanism;
    wherein the internal gear of the first planetary gear mechanism has a radially outer side and a radially inner side opposite the radially outer side, and wherein the radially outer side and the radially inner side of the internal gear of the first planetary gear mechanism each present helical teeth such that axial forces on the internal gear of the first planetary gear mechanism are compensated for, and such that the internal gear of the first planetary gear mechanism is guided radially by way of the helical teeth of the radially outer side and the radially inner side,
    wherein the internal gear of the first planetary gear mechanism is guided axially by way of two sliding guides.

2. An axle drive according to claim 1, wherein the internal gear of the first planetary gear mechanism rotates counter to a rotational direction of the first and second output shaft.

3. An axle drive according to claim 1, wherein the drive shaft drives or functions as a sun gear of the first planetary gear mechanism.

4. An axle drive according to claim 1, wherein a planetary carrier of the first planetary gear mechanism functions as an output to the first output shaft.

5. An axle drive according to claim 1, wherein an internal gear of the second planetary gear mechanism functions as an output to the second output shaft.

6. An axle drive according to claim 1, wherein planets of the second planetary gear mechanism are mounted fixedly on a housing.

7. An axle drive according to claim 1, wherein the drive shaft is a hollow shaft, and the first output shaft is arranged radially inside the drive shaft.

8. An axle drive according to claim 1, wherein the second output shaft is partially axially aligned with, and extends annularly about the first output shaft.

9. An axle drive, comprising a drive shaft, a first output shaft and a second output shaft, a first planetary gear mechanism and a second planetary gear mechanism, wherein the first planetary gear mechanism and the second planetary gear mechanism are configured to transmit a drive torque of the drive shaft to the first and second output shafts;
    wherein the second planetary gear mechanism is positioned radially on an outside of the first planetary gear mechanism and coaxially around the first planetary gear mechanism, and wherein an internal gear of the first planetary gear mechanism forms a sun gear of the second planetary gear mechanism;
    wherein the internal gear of the first planetary gear mechanism has a radially outer side and a radially inner side opposite the radially outer side, and wherein at least one of the radially outer side and the radially inner side presents helical teeth for compensating for axial forces applied against the internal gear;
    wherein at least one bearing is arranged radially between the first and the second output shafts.

10. An axle drive according to claim 9 wherein the at least one bearing includes at least one needle bearing.

11. An axle drive for a vehicle, comprising:
    a drive shaft;
    a first output shaft;
    a first planetary gear mechanism configured to transmit torque from the drive shaft to the first output shaft;
    a second output shaft,
    a second planetary gear mechanism configured to transmit torque from the drive shaft to the second output shaft;
    the second planetary gear mechanism located radially outside of, and coaxially about the first planetary gear mechanism;
    the first planetary gear mechanism including an internal gear that also functions as a sun gear of the second planetary gear mechanism;
    the internal gear of the first planetary gear mechanism having a radially outer side and a radially inner side opposite the radially outer side, and wherein at least one of the radially outer side and the radially inner side presents helical teeth for compensating for axial forces applied against the internal gear; and
    wherein the second output shaft is partially axially aligned with, and extends annularly about the first output shaft.

12. An axle drive according to claim 11, wherein the internal gear of the first planetary gear mechanism rotates counter to a rotational direction of the first and second output shafts.

13. An axle drive according to claim 11, wherein the radially outer side and the radially inner side of the internal gear of the first planetary gear mechanism each present helical teeth such that axial forces on the internal gear of the first planetary gear mechanism are compensated for, and wherein the internal gear of the first planetary gear mechanism is guided axially by way of two sliding guides and guided radially by way of the helical teeth of the radially outer side and the radially inner side of the internal gear.

14. An axle drive according to claim 11, wherein the drive shaft drives or functions as a sun gear of the first planetary gear mechanism.

15. An axle drive according to claim 11, wherein a planetary carrier of the first planetary gear mechanism functions as an output to the first output shaft.

16. An axle drive according to claim 11, wherein an internal gear of the second planetary gear mechanism functions as an output to the second output shaft.

17. An axle drive according to claim 11, wherein at least one bearing is arranged between the first and the second output shaft.

18. An axle drive according to claim 17, wherein the at least one bearing includes at least one needle bearing.

* * * * *